United States Patent [19]

Duback et al.

[11] Patent Number: 4,719,574
[45] Date of Patent: Jan. 12, 1988

[54] BATCH CONTROL SYSTEM

[75] Inventors: David W. Duback, Hoffman Estates; Thom D. Carpenter; Mark E. Skeels, both of Elgin; Christopher Ray, Evanston, all of Ill.

[73] Assignee: Accurate Metering Systems, Inc., Schaumburg, Ill.

[21] Appl. No.: 798,900

[22] Filed: Nov. 18, 1985

[51] Int. Cl.⁴ .............................................. G06F 15/56
[52] U.S. Cl. ................................ 364/468; 364/510; 222/63; 222/71; 137/3; 137/624.11
[58] Field of Search ............... 364/468, 478, 479, 509, 364/510; 137/2, 3, 12.5, 624.11; 222/14, 52, 63, 71

[56] References Cited

U.S. PATENT DOCUMENTS

| | | | |
|---|---|---|---|
| 3,949,207 | 4/1976 | Savary | 364/510 |
| 4,216,529 | 8/1980 | Krystek | 364/510 |
| 4,237,536 | 12/1980 | Enelow | 364/479 |
| 4,247,899 | 1/1981 | Schiller | 364/479 |
| 4,250,550 | 2/1981 | Fleischer | 364/465 |
| 4,353,482 | 10/1982 | Tomlinson | 364/479 |
| 4,412,292 | 10/1983 | Sedam | 364/479 |
| 4,414,634 | 11/1983 | Louis | 364/510 |
| 4,487,333 | 12/1984 | Pounder | 364/509 |
| 4,490,798 | 12/1984 | Franks | 364/510 |
| 4,527,245 | 7/1985 | Axelson | 364/478 |

FOREIGN PATENT DOCUMENTS 2130399  5/1984  United Kingdom ................ 364/479

Primary Examiner—Jerry Smith
Assistant Examiner—Allen MacDonald
Attorney, Agent, or Firm—Thomas R. Vigil

[57] ABSTRACT

The batch control system is used in a batching system for controlling the batching of a fluid material from one container to another container through a conduit having a pump coupled therein, a flowmeter coupled therein and a valve coupled therein. The batch control system includes a microprocessor; a keypad coupled to said microprocessor; a battery backed non-volatile memory coupled to the microprocessor; a serial port in the microprocessor; an alpha-numeric display coupled to the microprocessor; relay control outputs coupled to said microprocessor and to relays for controlling energization of the pump and the valve, respectively; at least one input coupled to the microprocessor for receiving count pulses from the flowmeter; and, outputs for supply data to a station remote from the location of the batch control system, such as a manager's office or a station at the location of one of the containers.

28 Claims, 18 Drawing Figures

BATCH CONTROL SYSTEM

BACKGROUND OF THE INVENTION

1. FIELD OF THE INVENTION

The present invention relates to a batch control system, also known as a microbatcher, which is used with batching and mixing apparatus for controlling, monitoring and totalizing the combining or mixing of fluids such as, for example, sugar and water for soft drinks or sugar and milk for making ice cream.

2. DESCRIPTION OF THE PRIOR ART

Heretofore, nonintelligent count controlling devices were coupled to pumps and valves in a batching and mixing apparatus. An operator would dial in the amount on the device that one desired to deliver from one liquid source and then press a reset button and a start button. A counter of the device would count down towards 0, and a relay contact would be closed prior to a 0 count to shut off a pump before a valve is shut off and the valve would be shut off at 0 count.

This was done for each liquid source and each batch without any totalizing of the batches per day, week, etc. Such count controlling device did not provide any adjustment such as to scale factor. Also, no rate readout was available and no communication capabilities were available with the prior devices. As a result, no print-outs of the total of a batch, the date or the time of the batch were available.

SUMMARY OF THE INVENTION

According to the invention, there is provided control means for use in a batching system for controlling the batching of a fluid material one container to another container through conduit means having a pump coupled therein, a flowmeter coupled therein and a valve coupled therein, said control means comprising:

a microprocessor;

a control panel;

a keypad coupled to said microprocessor and mounted on said control panel, said keypad including a set of control keys for instantly displaying and/or setting primary operating parameters for controlling a batching operation, said set of control keys including a COUNT key for calling up on the display in a single key actuation, the current batch count or, if entered, the preset count for this next batch and a PRESET key for calling up on the display in a single key actuation the number of units remaining to be delivered in a current batch;

battery backed non-volatile memory means coupled to said microprocessor;

a serial port in said microprocessor;

alphanumeric visual display means coupled to said microprocessor and mounted on said control panel;

relay control output means coupled to said microprocessor and to relays for controlling energization of the pump and the valve, respectively; and at least one input coupled to saie microprocessor for receiving count pulses from the flowmeter.

DESCRIPTION OF THE PREFERRED EMBODIMENT

Figure 1:
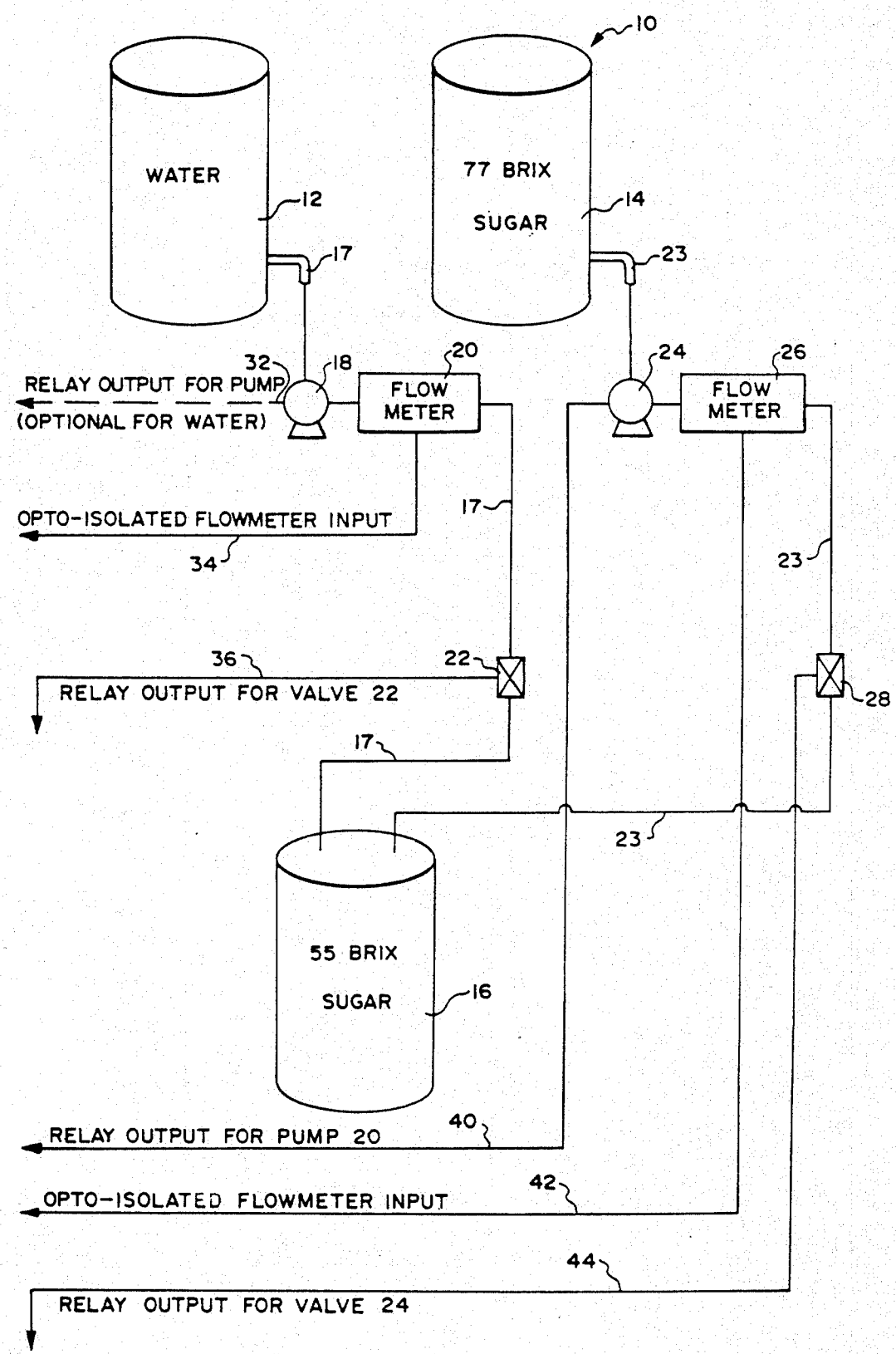
FIG. 1 is a block circuit diagram of a mixing and batching apparatus including two supply tanks, a mixing tank, delivery conduits, valves, pumps and flowmeters and shows control lines from a batch control system (or microbatcher) of the present invention coupled to the valve, flowmeter and pump in each delivery conduit.

Referring now to the drawings in greater detail, there is illustrated in FIG. 1 a block diagram of a mixing and batching apparatus 10 including a water supply tank 12, a sugar or sucrose supply tank 14 and a mixing tank 16. Also shown in FIG. 1 is a liquid supply conduit 17 from the water tank 12. The conduit 17 has coupled therein a water pump 18, a flowmeter 20, and a water control valve 22. The downstream end of the conduit 17 is connected to the mixing tank 16. In like manner, a liquid supply conduit 23 is connected between the sugar tank 14 and the mixing tank 16 and has coupled therein, a pump 24, a flowmeter 26 and a valve 28.

As shown, water is supplied from the tank 12 through the conduit 17 to the mixing tank 16. In like manner, sugar (in solution) is supplied via the conduit 23 to the tank 16.

The batch control system or microbatcher 30 (FIG. 2) of the present invention includes control lines which are connected to the respective pumps, flowmeters and valves. In this respect, an optional, relay output line 32 can be connected to the pump 18. Then an opto-isolated flowmeter input line 34 is connected to the flowmeter 20. Further a relay output line 36 for the valve 22 is connected to the valve 22. The lines 32, 34 and 36 are connected to one microbatcher 30.

In many systems, a relay output for the water pump 18 is not necessary such that only an optional relay output line 32 for water pump 18 is provided.

In like manner, a relay output line 40 is connected to the pump 24. An opto-isolated flowmeter input line 42 is coupled to the flowmeter 26 and a relay output line 44 for the valve 28 is connected to valve 28. The lines 40, 42 and 44 are connected to another microbatcher 30.

The mixing and batching apparatus 10 shown in FIG. 1 is for mixing water and sugar for the purpose of providing a sugar water mixture having a certain concentration of sugar or sucrose. In this respect, in the final mixture it is desired to have a solution having a sugar concentration of 55 BRIX. BRIX is a scale used in the sugar industry in which degrees on the scale represent percent pure sucrose by weight at 17.5° C. (63.5° F.).

In the illustrated embodiment, the end batch of the mixture is a sugar water solution having 55 BRIX obtained by mixing water and a sugar solution having 77 BRIX.

Such a batching and mixing apparatus 10 is used in the soft drink industry where sweetener is added to water to prepare a simple syrup with a desired amount of sugar. Subsequently, flavoring is added to the syrup which is then diluted and packaged.

However, the batching and mixing apparatus 10 can be used in the dairy industry where dairy and non-dairy products are mixed to create an ice cream mix which is then frozen and packaged.

Moreover, a further example of the use of the batching and mixing apparatus 10 is in the cosmetic industry where various ingredients are added to a reactor for mixing and aging prior to packaging or additional blending, such as for making shampoo, hair conditioner, makeup base, etc.

Figure 2:
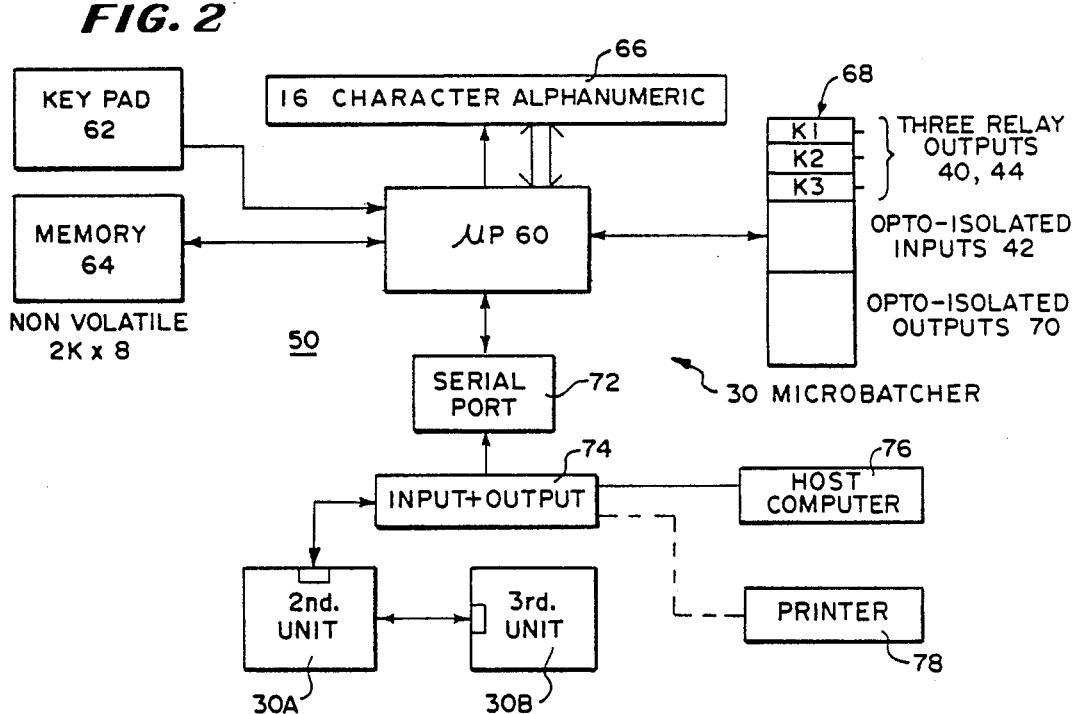
FIG. 2 is a block schematic diagram of the batch control system (or microbatcher) of the present invention.

Referring now to FIG. 2, there is illustrated therein a block schematic diagram of the control circuit 50 of one microbatcher 30 which is coupled to lines 40, 42 and 44 and which includes a microprocessor 60 having a keypad 62 input, a nonvolatile battery backed RAM or memory 64 coupled to the microprocessor 60, a 16 character alphanumeric display 66 coupled to the microprocessor 60, interface ports 68 including relay outputs for lines 40, 44, opto-isolated inputs, such as for connection to line 42, and opto-isolated outputs 70 for connection to peripheral devices or to another microbatcher 30.

For example, for a milk supply tank, it may be desired to supply 200 gallons of milk to a mixing tank, out of 1,000 gallons to be supplied, prior to the supply of heavier, high viscosity, sugar solution to the mixing tank. To accomplish this, a first microbatcher 30 is programmed to send a start (on relay energizing) signal at a count of 200 gallons to a second microbatcher 30 via one of the outputs 70 to start the supply of sugar solution to the mixing tanks.

Further, the microbatcher 30 includes a serial port 72 therein connected to an input/output interface device 74 such as an RS 232 interface device 74. This RS 232 interface device 74 can be coupled to other microbatchers 30A and 30B and/or to a host computer 76 and/or a printer 78.

The microprocessor 60 is typically an Intel 8031 microprocessor and provides all control, display and serial communication capabilities for the microbatcher 30. The program, protocol or routine for the microprocessor 60 is stored in the battery backed up RAM 64 having 8 kilobytes. Typically, the memory 64 is an industry standard 2764 (64 kilobyte arranged as 8192 times 8, ultraviolet erasable programmable read only memory—EPROM). Optionally, a 128 kilobyte memory (27128, 16384 times 8—EPROM) may be used for additional customized applications. The use of a larger memory allows programming to be carried out using a high-level source language (Intel/PLM-51) which facilitates user program generation and updating.

Parameters for operation of each microbatcher 30 are stored in the memory 64 which is referred to as a BRAM 64 (BRAM being the acronym for Battery Backed Ramdom Access Memory). This is a unique randon access memory in that the memory is organized as 2048 times 8 and is directly compatible with the microprocessor 60. Self-contained lithium batteries are provided in the BRAM 64 to provide data retention in the event of power loss and to protect the memory against inadvertent overwriting of data whenever the power supply voltage drops below a specified level. Because that level is above that specified for the minimum operational level for the microprocessor 60, no chance exists for improper data transfer to the BRAM 64.

Direct operator control is provided through the keypad 62 by which data can be entered by an operator. Because the microprocessor 60 accepts data directly from the keypad 62, a static metal shield is incorporated integral to the keypad/front panel overlay 80 (FIG. 3) which forms part of the shield. This shield which includes the front panel overlay 80, dissipates high-voltage potential before it can damage the sensitive microprocessor 60.

As will be described in greater detail in connection with the description of FIG. 3, a 16-character alphanumeric display 66 provides feedback of system parameters to the operator. In this respect, English-language prompting, error messages and parameter identification are available with the alphanumeric capability of the display 66.

Connections to the outside world, namely to the batching and mixing apparatus 10 are provided by the interface ports 68 which consist of three (3) optically isolated inputs, two (2) opto-isolated outputs (outputs 70), and three (3) relay outputs, K1, K2 and K3.

The optical isolation and relay control provide high noise immunity when coupling signals from or to the microprocessor 60 to or from the outside environment.

The typical inputs provided to the microprocessor 60 are as follows:

A high speed count input (1KHZ),

A remote start input (supply of 5 volts or greater is recognized as a start signal) separate from the START key on the keypad 62. Such start input would be located adjacent to one of the supply tanks and could be operated by an operator at that location, and A remote stop input (normally supplied with 5 volts or greater;—absence of this signal is recognized as a STOP command) which again is located at a remote location, such as at the location of the supply tank.

The outputs provided by the microprocessor 60 are as follows:

A cycle-in progress output,

An optically-coupled, open collector transistor will be in the On conducting state whenever one of the control relays, K1, K2, K3, is energized, A scaled-pulse out signal, which provides a conducting state for an optically isolated, open collector transistor for a period of one half millisecond every time that the descending counter, which controls the relays, is decremented. This can be used for remote totalization for inventory purposes, AND A totalizer is also programmed into the microbatcher 30 and a display of the total is displayed upon depressing the TOTAL key on the keypad 62 as will be described in greater detail in connection with the description of FIG. 3.

The outputs from the relays K1, K2 and K3 will be described in greater detail in connection with the description of FIG. 3.

As shown, the microprocessor 60 has a self-contained serial/input/output port 72. The rate of communication to this port 72 is a sub-multiple of the clock oscillator for the microprocessor 60. The frequency of oscillation is controlled by a crystal and this is preferably a crystal which provides an 11.0592 MHz clock rate. When properly divided, this rate forms a base which ensures that industry-Baud rates are generated. Thus, the microbatcher 30 is rate-compatible with almost all outside computers, programmable programers and printing-/display devices having a serial port.

Figure 3:
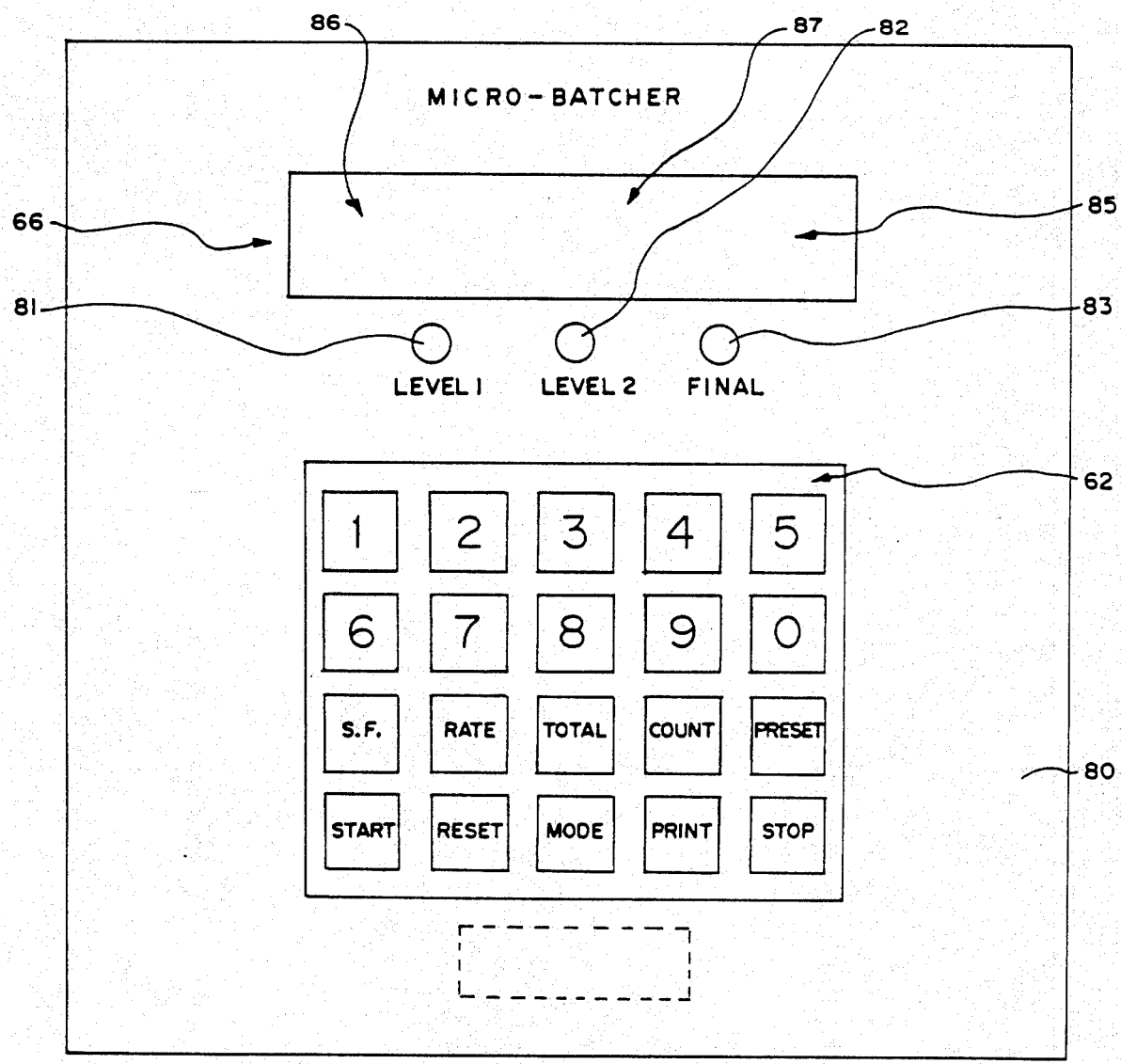
FIG. 3 is an enlarged plan view of the keypad and visual display of the microbatcher shown in FIG. 2.

Referring now to FIG. 3, there is illustrated therein the front panel 80 on which is mounted the keypad 62 and the alphanumeric 16 segment visual display 66.

As shown, the keypad 62 includes number keys 0-9, a SCALE FACTOR key, a RATE key, a TOTAL key, a COUNT key, a PRESET key, a START key, a RESET key, a MODE key, a PRINT key and a STOP key. Through manipulation of these keys, various operations can be performed by an operator with the microbatcher 30. The various keys, including the number keys, are used in conjunction with the MODE key and a mode code number for implementing various functions. In this respect, the MODE key is used to implement alternate function capabilities and change the system values, such as SCALE FACTOR, ZERO the TOTAL COUNT, etc. Once the MODE key is pressed, a function prompt will be displayed on the visual display 66. Then the value key sequences listed in the table below can be used to change or set operation of the microbatcher 30. It will be understood, of course, that other mode codes can be utilized in modifications of the microbatcher 30.

| KEY SEQUENCES | EFFECT |
| --- | --- |
| * MODE S.F. | Sets the SCALE FACTOR to the number on display (right side). |
| * MODE TOTAL | This sequence zeros the TOTAL. |
| MODE PRESET | Sets the PRESET value to the number on display. |
| MODE 00 | Enters the EDITER mode to modifing the custom serial output format for output to the RS-232C. |
| * MODE 01 | Sets the RS-232C communication rate to 300 Baud. |
| * MODE 02 | Sets the RS-232C communication rate to 1200 Baud. |
| * MODE 03 | Sets the RS-232C communication rate to 2400 Baud. |
| * MODE 04 | Sets the RS-232C communication rate to 4800 Baud. |
| * MODE 05 | Sets the RS-232C communication rate to 9600 Baud. |
| * MODE 06 | Sets the RS-232C communication rate to 19200 Baud. |
| * MODE 08 | Sets the FLOW FACTOR to the number on display. Upon successful entry, the new FLOW FACTOR will be displayed. xxxxx FF were xxxxx is the numeric value. |
| MODE 09 | This displays the version number of an EPROM used to program the Micro-Batcher |
| MODE 10 | This sequence calls the FLOW FACTOR to the display. |
| MODE 11 | This sequence sets the access code. First the desired two-digit access code is entered so that only two-digits are viewed at the right hand side of the display. |
| MODE 12 | This sequence is used to display the values for the LEVEL 1 and LEVEL 2 precontacts. When this sequence is entered, 1 or 2 ? will appear to prompt an operator for the respective LEVEL. Entering 1 will display LEVEL 1, and entering 2 will display LEVEL 2. The format is xxxxx LEVEL 1 for the LEVEL 1 precontact, and xxxx LEVEL 2 for the LEVEL 2 precontact, where xxxxx is the numeric value of the LEVEL. |
| * MODE 13 | This sequence is used to change the value of the LEVEL 1 and LEVEL 2 precontacts. First the numeric value is entered on the display, then enter MODE 13. After MODE 13 is entered, the 1 or 2 ? prompt will appear asking for the respective LEVEL. After the operator chooses the LEVEL, the prompt for the access code, ACCESS = ?, is displayed. The display verifies the change in LEVEL value as formatted above in MODE 12, after successful entry of the ACCESS code. |
| MODE 14 | This sets the device code for RS-232C serial communication. |
| MODE 15 | This sets up the Micro-Batcher to update the FLOW RATE at integral multiples of 50 milliseconds. This is set at the factory. |
| MODE 16 | This sets the divison factor of the microbatcher. This is set at the factory. |

*Means that a two-digit access code must be entered to complete the desired function.

With respect to the LEVELS 1, 2 and FINAL and associated relays, it will be noted that indicator lamp 81 for LEVEL 1, lamp 82 for LEVEL 2 and lamp 83 for FINAL are mounted on the panel 80.

The most common application or use of one of the LEVELS 1 or 2 relays is to turn off a pump before the valve is closed at the end of a batch cycle upon operation of the "FINAL" relay. If the valve must work against the head pressure of the pump, it would close more slowly and too much product may be delivered. An indication of this would be an "underflow" of the count that would appear on visual display 66 (when the COUNT key is depressed) as a number like 99996 instead of 0.

To correct for this overshoot in the supply of liquid, the LEVEL 2 variable is adjusted to the amount of overdelivery. For example, a count of 4. The LEVEL 2 relay line is then coupled to the relay for the sugar pump such as pump 24 and shuts pump 24 off when there is a count of 4. This is accomplished by pressing "4 MODE 13" followed by a "2" in response to a prompt appearing on the visual display 66. Then, by entering the direct access code, LEVEL 2 will be set to shut off at 4 units or counts. This figure may be adjusted up and down until the microbatcher 30 is able to shut off product flow after the preset amount has been delivered and the final count is 0. In this respect, level FINAL is connected to the valve 28 via control line 44, delivered to the mixing tank 16. Also, pressure between pump 24 and valve 28 is to be kept at a minimum.

As shown in FIG. 3, which is a plan view of the front panel 80 of the microbatcher 30, the visual display 66 shows current values of system parameters as well as giving prompts and messages.

The lamps 81, 82 or 83 indicate which relay is energized, LEVEL 1, LEVEL 2 or FINAL relay.

As shown, the keypad 62 has 3 groups of keys which include the numeric keys for digits 0-9. These number keys are depressed until a right hand area 85 on the visual display 66 shows a desired value. Five digits are possible and entry of more than five digits causes a rollover with only the last five digits entered being retained and shown in the area 85. Also, leading zeros are supressed.

The next group are the call up keys which is the first row of keys after the number keys and are similar in function. However, each key calls up its own parameter. In this respect, when any one of the S.F., RATE, TOTAL, COUNT, PRESET keys are pressed the display will show the current value of that parameter in the following manner:

| BUTTON | EFFECT | DISPLAY |
|--------|--------|---------|
| S.F. | show SCALE FACTOR | xxxxx SF |
| RATE | show FLOW RATE | xxxxx FL |
| TOTAL | show TOTAL | xxxxxxxx T |
| COUNT | show COUNT | xxxxx CT |
| PRESET | show batch PRESET | xxxxx PR |

The SCALE FACTOR tailors the microbatcher 30 to the particular flowmeter, e.g. flowmeter 26, connected to it. This is usually a one-time setting.

The FLOW RATE continuously shows the flowrate (units per time) of the product. The FLOW RATE is normally updated once a second.

The TOTAL shows the total product delivered.

The COUNT shows the descending COUNT of the microbatcher 30.

When the RESET is pressed, the batch PRESET value is loaded into the COUNT value. Thereafter, each time a unit of product has been delivered, the COUNT value is decremented and the TOTAL value is incremented.

The PRESET is the quantity of product to be delivered.

The last row of keys are operational keys. Depressing the START key will initiate a batch cycle when the microbatcher has been RESET. When the START button is pressed and the message "NOT RESET" is displayed on the visual display 66, then the RESET button must be pressed. Then the appropriate relays are energized, allowing the product to move. The relays turn on and off according to the following rules:

LEVEL 1 relay turns on when the LEVEL 1 preset value is less than the current COUNT value. LEVEL 1 relay turns off when the descending COUNT value is less than or equal to the LEVEL 1 preset value. This LEVEL 1 value is an optional value and is typically used when one is making ice cream and wants to fill the mixing tank 16 with a quantity of milk prior to adding sugar. For example, for a total delivery of 1,000 gallons of milk, LEVEL 1 may be set at 800 gallons so that when the COUNT has decreased from 1,000 to below 800, the LEVEL 1 relay is turned on to supply a signal through relay K1 to another microbatcher 30.

LEVEL 2 relay turns on when the LEVEL 2 preset value is less than the current COUNT value. LEVEL 2 relay turns off when the descending COUNT value is less than or equal to the LEVEL 2 preset value, such as a PRESET value of 4 units or gallons as described above.

The FINAL relay always comes on at the START of the batch cycle. The FINAL relay turns off when the descending COUNT value is zero.

When the RESET key is pressed, the microbatcher resets itself for a new batch. The current value of the PRESET is loaded into the COUNT and this value is displayed. If the microbatcher 30 was in the middle of a batch cycle when the STOP key is pressed causing the microbatcher 30 to be in a PAUSEd state, pressing the RESET key will abort that batch. Likewise, if power was lost during a batch cycle, upon power up, the display will show the message "MID CYC PWR LOSS". If the RESET key is pressed at this point, it will abort the batch cycle, if so desired, or else the batch can be reSTARTed.

As described above, the MODE key is used in conjunction with other key sequences for alternate functions and/or changing system values such as SCALE FACTOR, PRESET, etc.

The PRINT key when depressed causes the microbatcher 30 to print out a defined message and system variables such as TOTAL, PRESET, ETC. according to a user defined format, providing, of course, that the microbatcher 30 is coupled to a printer 78.

The STOP key is depressed to STOP the batch cycle. When pressed, all relays are de-energized and the message PAUSE is displayed on the right hand side 85 of the display. The microbatcher 30 is then in the PAUSEd state. The batch may be continued by pressing the START key.

If the operator wishes to abort the batch, he will press the RESET key.

Upon applying at least 100 volts AC to the power supply of the microbatcher 30, the display should read READY 0. When shipped from the factory, the microbatcher 30 needs no calibration with the exception of entering the SCALE FACTOR and the FLOW FACTOR to tailor the individual flowmeter used to the microbatcher 30.

In the use of the microbatcher 30 in conjunction with the apparatus 10 shown in FIG. 1, to obtain a certain quantity of 55 BRIX sugar starting from "scratch", one first determines a so-called K Factor for the flow meters 20 and 26. That K Factor indicates how many pulses per gallon one can expect the microbatcher to receive.

A reciprocal of the K Factor called the Scale or Scaling Factor is entered on the keypad 62 into the microbatcher 30 and takes into account the number or the units which the customer wishes to deal with in making the batch. If the specific weight of the product is constant, one can multiply into the formula a factor to obtain the SCALE FACTOR which reads out in pounds. Typically, the SCALE FACTOR reads out in gallons.

With respect to the illustrated apparatus 10, $$\text{FINAL BRIX (55 BRIX)} = \frac{\% \text{ Solid Sugar} \times \text{Weight Sugar}}{\% \text{ Sugar} \times W_s + W_w}$$

$$55 = \frac{77 \times W_s}{77 W_s + W_w} \text{ and } \frac{W_s}{11.7} + \frac{W_w}{8.345} = \text{Tank Volume}$$

$$\text{Then: } \frac{W_s}{11.7} = A \text{ and } \frac{W_w}{8.345} = B$$

with $W_s$ and $W_w$ being determined empirically such that microbatcher A is set at 1200 and microbatcher B is set at 600.

In another example, for 500 pulses per gallon one would divide 100,000 by 500. This number would be 200 which is then entered into the microprocessor via the numerical keys and 200 would be displayed in the right hand area 85 on the display 66 and verifies to the operator what the SCALE FACTOR is. As numbers are entered into the visual display, they first appear in the right hand area 85. Then when the operator depresses the MODE and SCALE FACTOR keys, the number moves over to the left hand side area 86 and then comes back to a central area 87 with an alphabetic designation appearing in front of the number in the area 86 (or behind the designation). For example, 200 S.F. would appear in the areas 86 and 87 on the visual display.

Next, an operator would check to see that the level relay contacts for LEVEL 1 and LEVEL 2 and FINAL are set for 0 actuation by depressing keys "MODE 12". Then the numbers 1 or 2 will appear on the display 66 and the word PROMPT. Entering 1 will display LEVEL 1 and entering 2 will display LEVEL 2. In the beginning, all levels are set to 0. Then, with respect to the batching and mixing apparatus 10, only LEVEL 2 is of concern. Again, as stated above, a batch is run to find out what is the overshoot as indicated by the "underflow" displayed on the visual display 66. Again, assuming 99996 is displayed, the operator knows that the LEVEL 2 relay should be set at 4 so that when a COUNT of units 4, such as count in gallons is reached, the LEVEL 2 relay will be de-energized to shut off the pump 24. Then, of course, the FINAL relay controlling the valve 28 will be shut off when the COUNT is zero.

The next step in the operation of the microbatcher 30 is for the operator to key in the amount desired to be delivered, such as 1,000 gallons. This is accomplished by first keying in the number 1,000 which appears at the right hand side area 85 of the display 66. Then the operator presses the keys MODE and PRESET. This gives a positive feedback in that it transfers the number over to the left hand area 86 and then PRESET following in the middle area 87 of the display 66.

Next, the RESET key is depressed to tell the microbatcher 30 that it is starting with a totally new batch. The response seen on the display 66 to the pressing of the RESET key is 1,000 and the word PRESET on the display changes to COUNT so as to tell the operator what the COUNT is. This COUNT number on the display 66 feeds back to the operator that the microbatcher 30 is reset and that the current COUNT of the amount that is left to be delivered is 1,000 gallons. Then, whenever it is desired to start the batching process, the operator presses START.

At any time during the run the operator can press RATE to find out the FLOW RATE and knowing the FLOW RATE he knows how long the run is going to take in case he has to leave the station where the microbatcher 30 is located.

Alternatively, he can recheck the COUNT, or by pressing the TOTAL key, then he can find out the total delivery or the total amount of batching accomplished that day with the microbatcher 30 by pressing the TOTAL key.

Also, if the FLOW RATE is very low that might indicate a bushing in the pump slipping or a leak in the system and the pressing of the RATE key can then be used as a diagnostic tool.

As long as the operator does not hit the RESET key, he can start and stop the batch at will. Also, the operator can change the batch TOTAL by stopping the batch and reading the count which could be, for example, 500 out of a 1,000 original COUNT. Assuming that he wants to change the Batch Quantity to 800 rather than 1,000. If such is the case, the operator can key in 300 and then depress the MODE key, followed by the PRESET key and then hit the RESET key followed by pressing the START key.

Additionally, if the operator is in the middle of a batch and wants to change from 1,000 to a batch of 500 for the new batch, the operator can key in 500 and then press the MODE key and the PRESET key so that the microbatcher 30 is set to batch 500 units, e.g. gallons in the next batching operation.

The PRESET is identified in this case with NEXT BATCH in areas 86 and 87 and the newly entered preset value in area 85. Depressing the PRESETR key in this state (new preset entered while batching) will then alternate betrween THIS BATCH (areas 86,87), with the amount currently being delivered (area 85), and the aforementioned NEXT BATCH with the new preset.

Figure 4B:
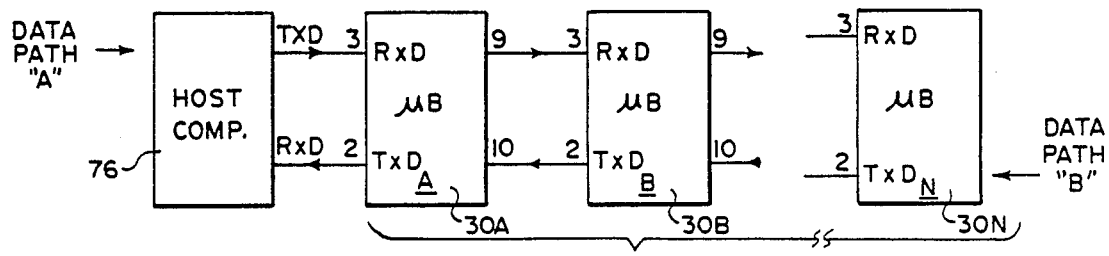
FIG. 4B is a block schematic diagram of the daisy chain shown in FIG. 4A and shows the serial connection of the host computer to a plurality of microbatchers.
Figure 4A:
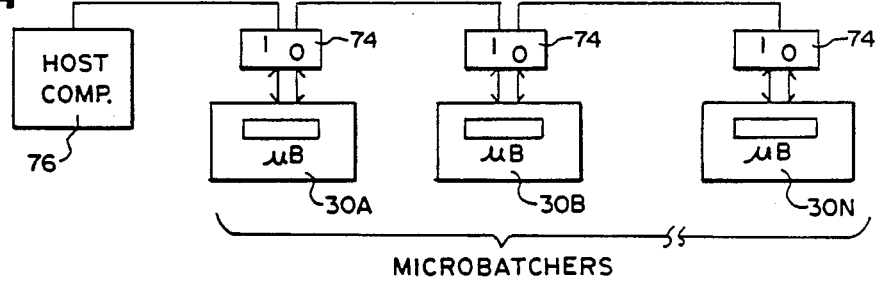
FIG. 4A is a block diagram of the serial, daisy chain connection between a host computer and a plurality of microbatchers through input/output (I/O) interface devices.

Referring again to FIG. 2 and also to FIGS. 4A and 4B, it will be understood that the serial port 72 enables the host computer to accomplish anything that an operator may do with the keys on the keypad 62. However, this feature is severely restricted when the microbatcher 30 is in operation for safety reasons.

The format of an output data stream may be controlled by full programming of the microbatcher 30 using a simple procedure to instruct the microbatcher 30 as to which ASCII characters should be sent and in which order. In addition, ASCII control codes are programmable and the format can be stored in the battery backed memory or BRAM 64 and thus need only be programmed once.

The wiring of circuits to a standard 25 pin female socket used for an RS-232 interface device or input/output port 74 allows easy daisy-chaining of microbatchers 30, as shown in FIG. 4A.

Referring to FIG. 4B, incoming data is routed directly out of the microbatcher 30 maintaining standard logic levels at the D connector (data path A).

Data path B shows how outgoing data is "OR"ed together with outgoing data from a previous microbatcher 30. It should be apparent that any number of microbatchers 30 can be added to this chain so long as the data transfer follows the data path shown in FIG. 4A and 4B.

The circuit connections leave open the use of pins 18 and 25 of a 25 pin "D" subminiature connector used for interfacing with the input/output port or RS-232 interface port 74. The microbatcher 30 supplies +12 volts DC to pin 18 and −12 volts DC to pin 25.

As a result, the microprocessor 60 is directly plug-compatible with a fiber-optic link. Power for the fiber-optic link can be provided via pins 18–25 with data transfer using the standard T×D (transmit data) and R×D (receive date) on pins 2 and 3, respectively. This greatly simplifies the incorporation of the highly-noise immune fiber-optic link when the host computer 76 is some distance from the microbatcher 30.

As stated above, the microbatcher 30 is addressable via the serial port 72. This is necessary in order to implement the hardware daisy-chaining described above. A one byte (2-character) address or access code is transmitted at the beginning of each data transmission. Only a microbatcher 30, which has been field programmed (via the front panel 80) to respond to this address, will accept commands from a host computer 76 or other programmable controller.

Figure 5:
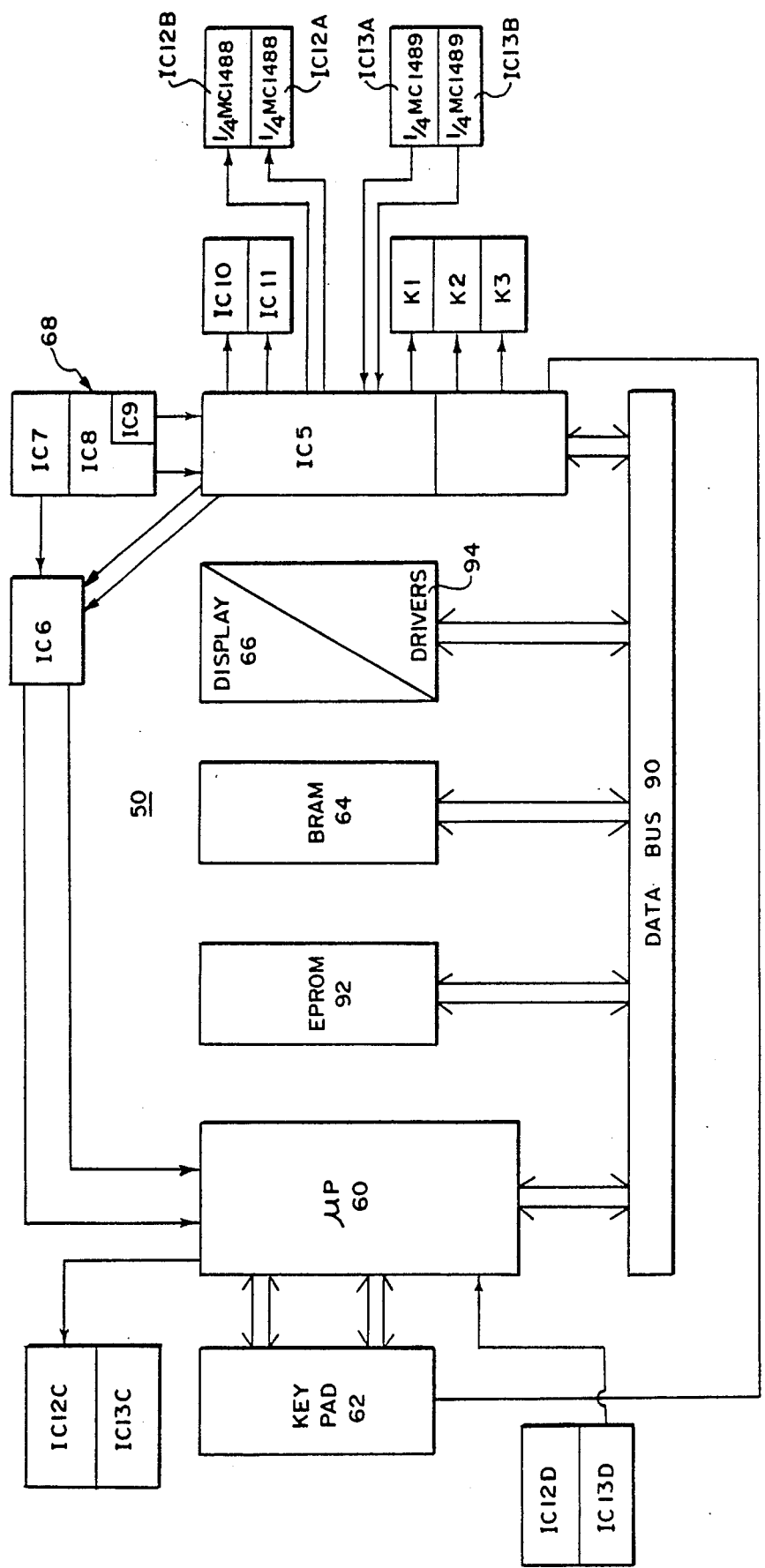
FIG. 5 is a block schematic circuit diagram of the electrical control circuit of the batch control system/microbatcher of the present invention.

Referring now to FIG. 5, there is illustrated therein a block schematic diagram of the control circuit 50 of the microbatcher 30. It will be seen that the keypad 62 is coupled to the microprocessor 60 and the microprocessor 60 and the BRAM 64 are connected to a data bus 90 to which is also connected an additional memory, in the form of an EPROM 92, and display drivers 94. Also coupled to the bus 90 is an input/output expander with RAM identified as IC 5.

Coupled to the input/output expander IC 5 are the relay outputs K1, K2 and K3. Also connected to the input/output expander IC 5 are opto-isolated COUNT inputs IC 7 and opto-isolated CONTROL inputs IC 8 and IC 9. Further, opto-isolated outputs IC 10 and IC 11 are coupled to the input/output expander IC 5, as shown.

The opto-isolated (IC 7) COUNT input is coupled to a programmable divide chip IC 6 which optionally divides the input pulses into a smaller amount of pulses which can then be supplied to the microprocessor 60.

The outputs IC 10 and IC 11 are a scaled pulse out and a BATCH-IN-PROGRESS pulse out and could go to a Manager's Office. In this respect, it is to be noted that one can communicate with the microbatcher 30 either through the serial input/output port 72 or through the opto-isolated inputs and outputs IC 7-11.

The serial input/output port 72 is defined in FIG. 5 by IC 12C and IC 13C and IC 12D and IC 13D. IC 12D and IC 13D are serial input/output circuits and IC 12C and IC 13C are reverse serial intput/output circuits. IC 12A, IC 12B and IC 13A and IC 13B also form part of the serial port 72 and are required for "handshaking" between the microprocessor 60 and the host computer 76 or a programmable controller.

The input/output expander with RAM, IC 5, provides dedicated input and output lines that can be controlled by the microprocessor 60 via a vis the data bus 90.

The programmable divider IC 6 reduces a large number of counts by a division such as by 10, 100, 1000 etc. to a number which can be more easily utilized and manipulated by the microprocessor 60.

The opto-isolated outputs IC 10 and IC 11 (70 in FIG. 2) could also go directly to a computer.

Figure 6:
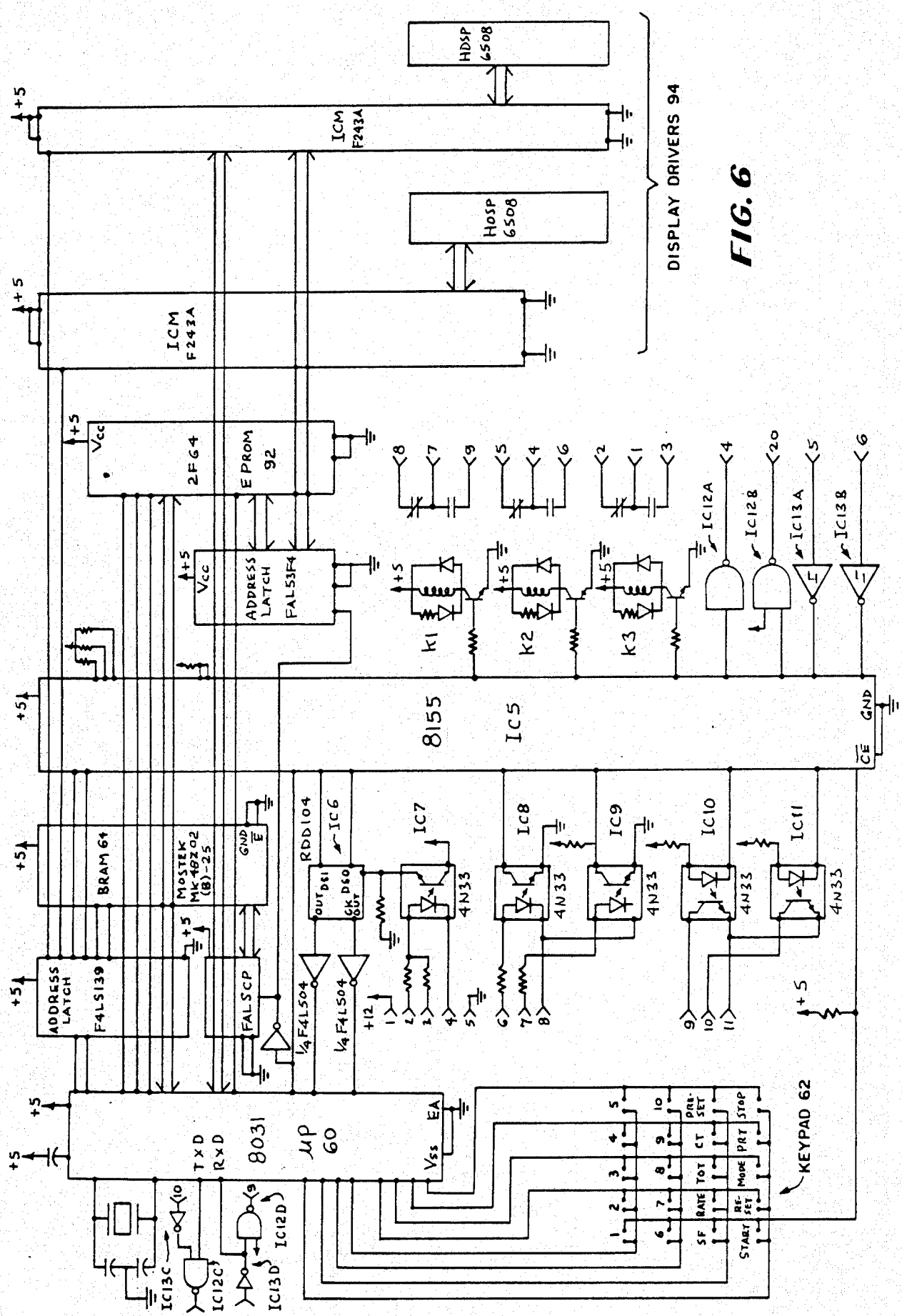
FIG. 6 is a more detailed schematic circuit diagram of the electrical control circuit shown in FIG. 5.

FIG. 6 is a more detailed schematic circuit diagram of the control circuit 50 shown in FIG. 5 and the various components shown therein are identified with the same reference characters as used in FIG. 5. Also, the various pin connections are shown.

Figure 7:
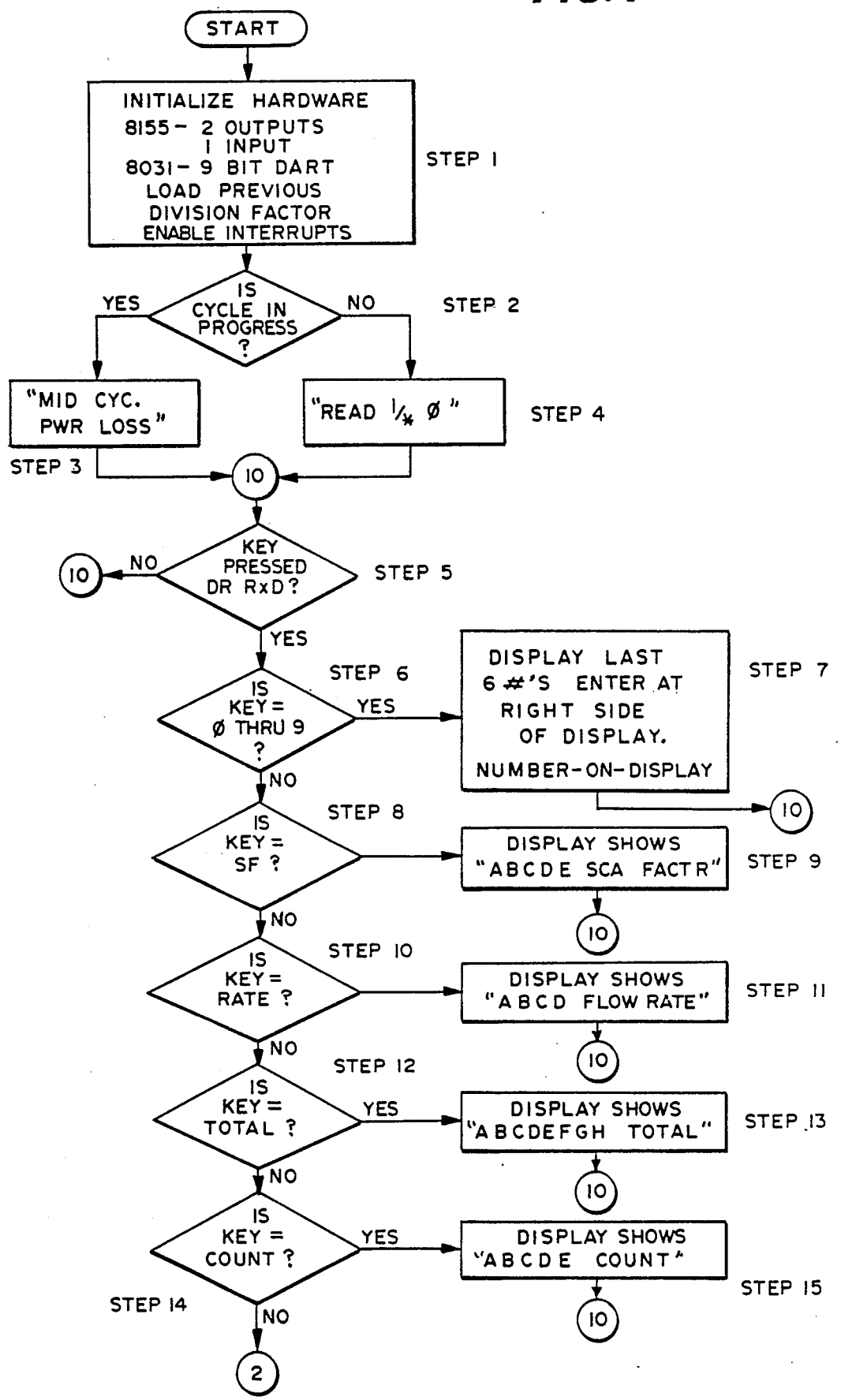
FIGS. 7 and 8 are flow charts of the routine or protocol carried out by the microprocessor of each microbatcher in setting up the microprocessor for batching.
Figure 8:
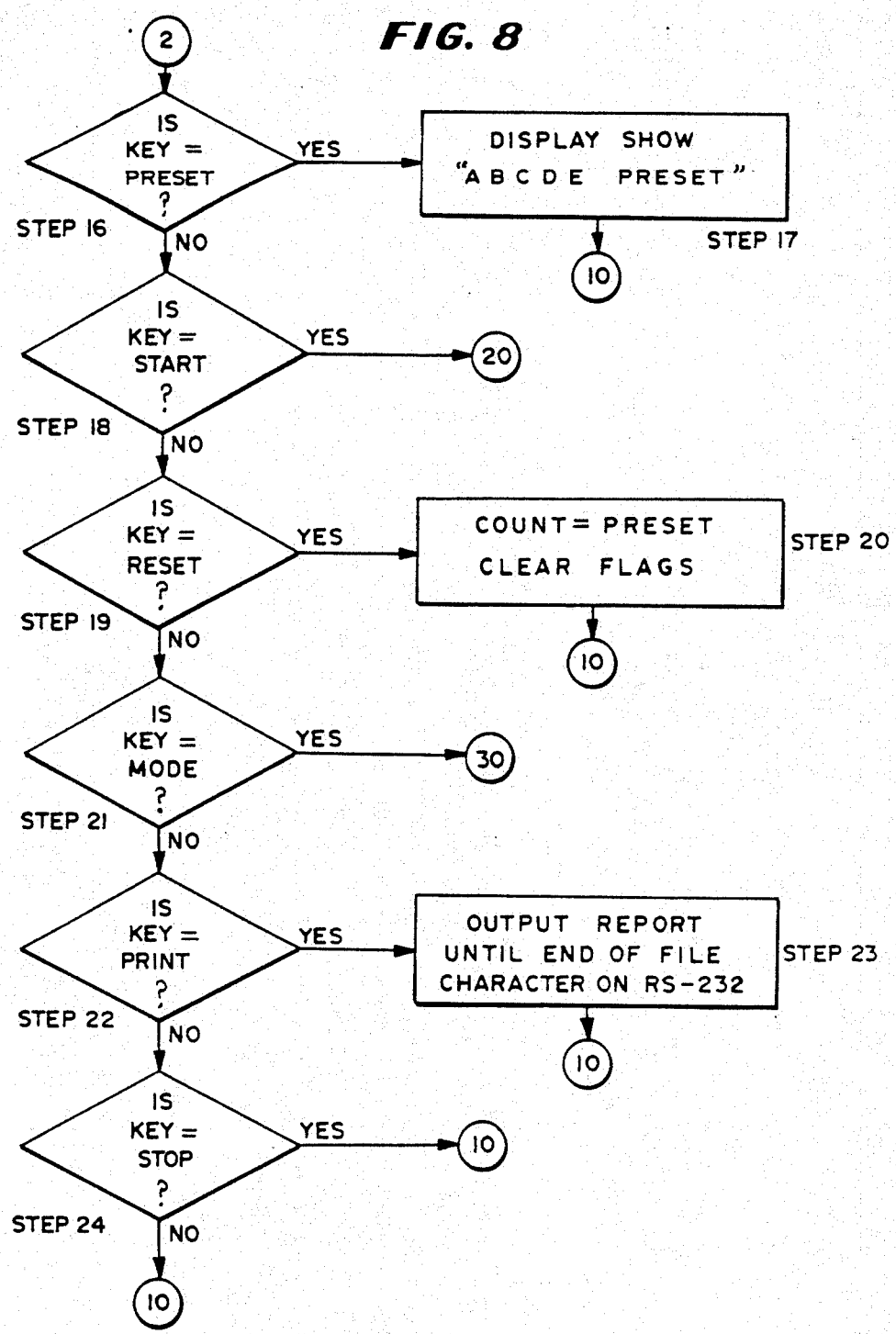

Referring now to FIGS. 7–14, there is illustrated therein flow charts of the routine or protocol carried out by the microprocessor 60 of the microbatcher 30 in effecting a batching operation or run of a batch. As shown in FIG. 7, the first step after the START button has been pressed is to initialize the hardware and to load a previous division factor, e. g., for the pulses coming from the flowmeter 26 via the input line 42, and to enable the interrupts.

At the STEP 2, a question is asked if a cycle is in progress. If yes, the visual display 66 will show a STEP 3 "MID CYC PWR LOSS".

If not, at STEP 4 the visual display will show "READY 0".

Then, at STEP 5 the question is asked has a key been pressed or has the data come in through the input output innerface device 74 or one of the inputs IC 7, IC 8 or IC 9.

If the answer at STEP 5 is no, the program loops back to the input of STEP 5.

If the answer is yes, the program goes on to STEP 6 to determine if the key depressed is key 0 through 9.

If the answer is yes, the program goes on to STEP 7 where the visual display 66 shows the last five (5) numbers entered at the right side of the display. From there, the program loops back to the beginning of STEP 5.

If the answer is no at STEP 6, the program continues to determine which key or keys have been depressed and displays on the visual display 66, the particular number related to the key depressed and loops back to node 10. Then the parameter being checked by the depression of a key, such as at STEP 8 where a determination is made if the SCALE FACTOR key has been depressed is made. If the SCALE FACTOR key had been depressed the SCALE FACTOR number and S.F. is shown on the display 66 at STEP 9 and the program loops back to node 10.

Similar determinations are then made at STEPS 10 through STEP 17.

If the answer is yes that the START key has been depressed at STEP 18, then the program loops to node 20 which is the input for the batching subroutine shown in FIGS. 9 and 10 which will be described below.

If the answer is no, the program goes on to STEP 19 to determine if the key depressed is the RESET key.

If yes, the program goes on to STEP 20 to display RESET and to clear flags.

If the answer is no, the program goes to STEP 21 where a determination is made if the MODE key had been pressed. If yes, the program loops to node 30 which is the input for the MODE subroutine shown in FIGS. 11–14 which will be described in greater detail below.

If the answer is no, the program goes on to STEP 22 to determine if the PRINT key was depressed. If yes, the program goes to STEP 23 where an output report is sent via the input/output interface (RS 232 interface) until end of file character and then loops back to node 10.

If the answer is no, the program goes on to STEP 24 to determine if the STOP key has been depressed. If yes, the program loops to node 10 and if no, the program loops to node 10.

Figure 9:
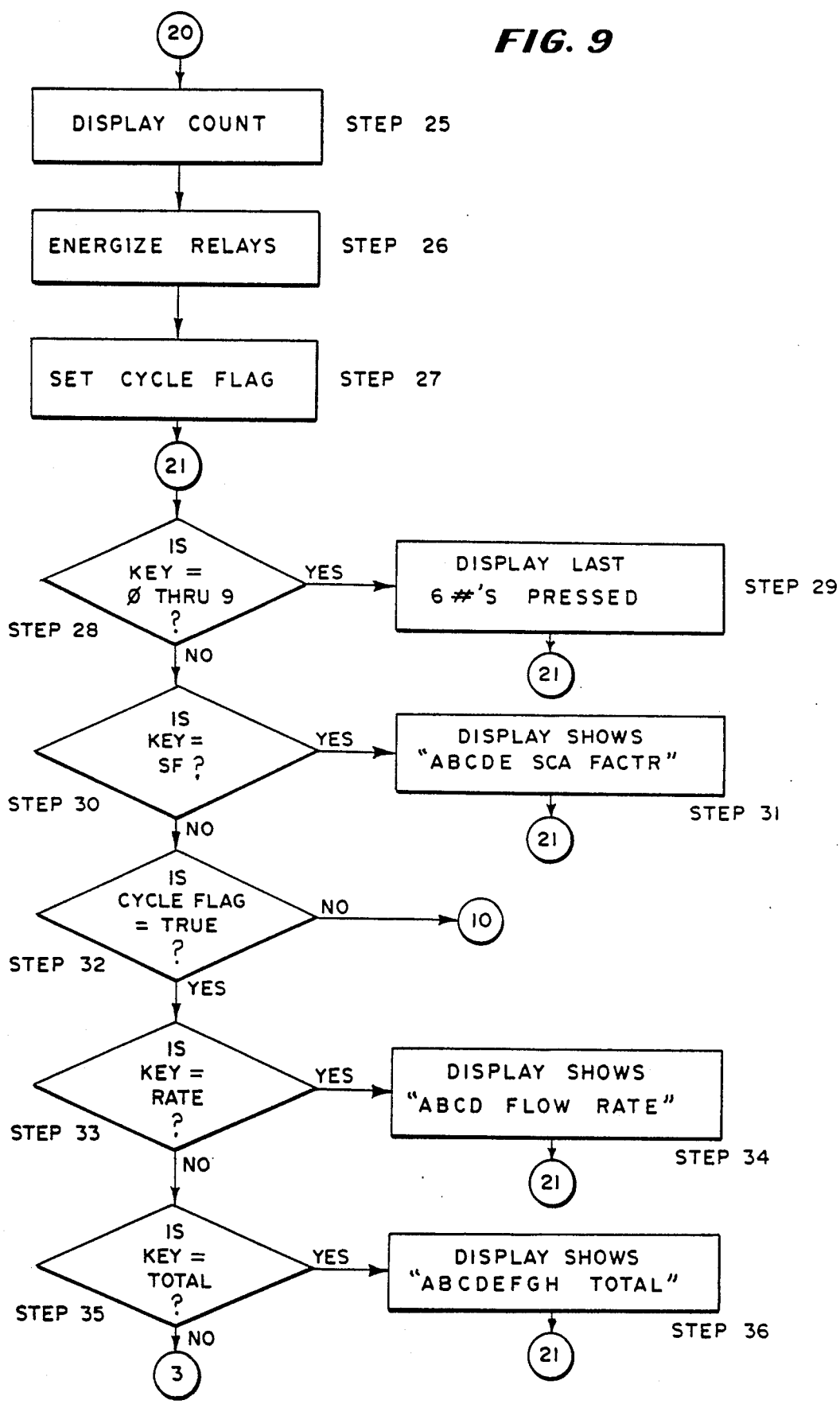
FIGS. 9 and 10 are flow charts of the routine or protocol carried out by the microprocessor of each microbatcher setting up a batching run or cycle.

In FIG. 9 is illustrated the subroutine which begins at node 20 for displaying COUNT, SCALE FACTOR, FLOW RATE and TOTAL.

At step 25, the COUNT is displayed on the visual display.

At STEP 26, the level relays (LEVEL 1, LEVEL 2 and FINAL) are energized.

At STEP 27, the cycle flag is set.

Then the program goes to node 21 and to STEP 28 where the question is asked if a number key has been depressed.

If yes, there is a display of the number at STEP 29 and the program loops back to node 21.

A similar procedure occurs at STEPS 30 and 31 for SCALE FACTOR.

At STEP 32 a determination is made if the cycle flag is true. If no, the program loops back to node 10 at the beginning of STEP 5.

Figure 10:
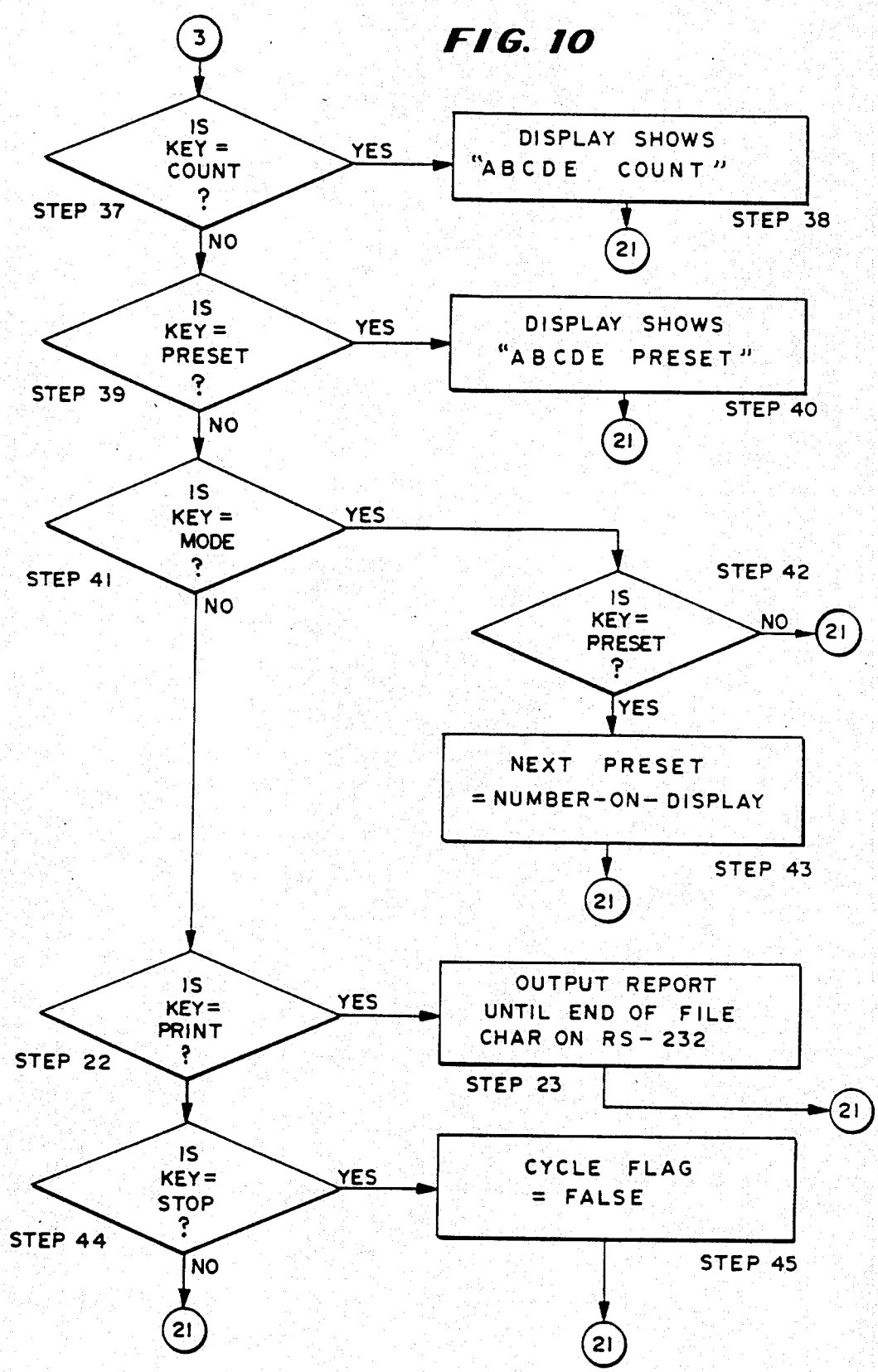
Figure 11:
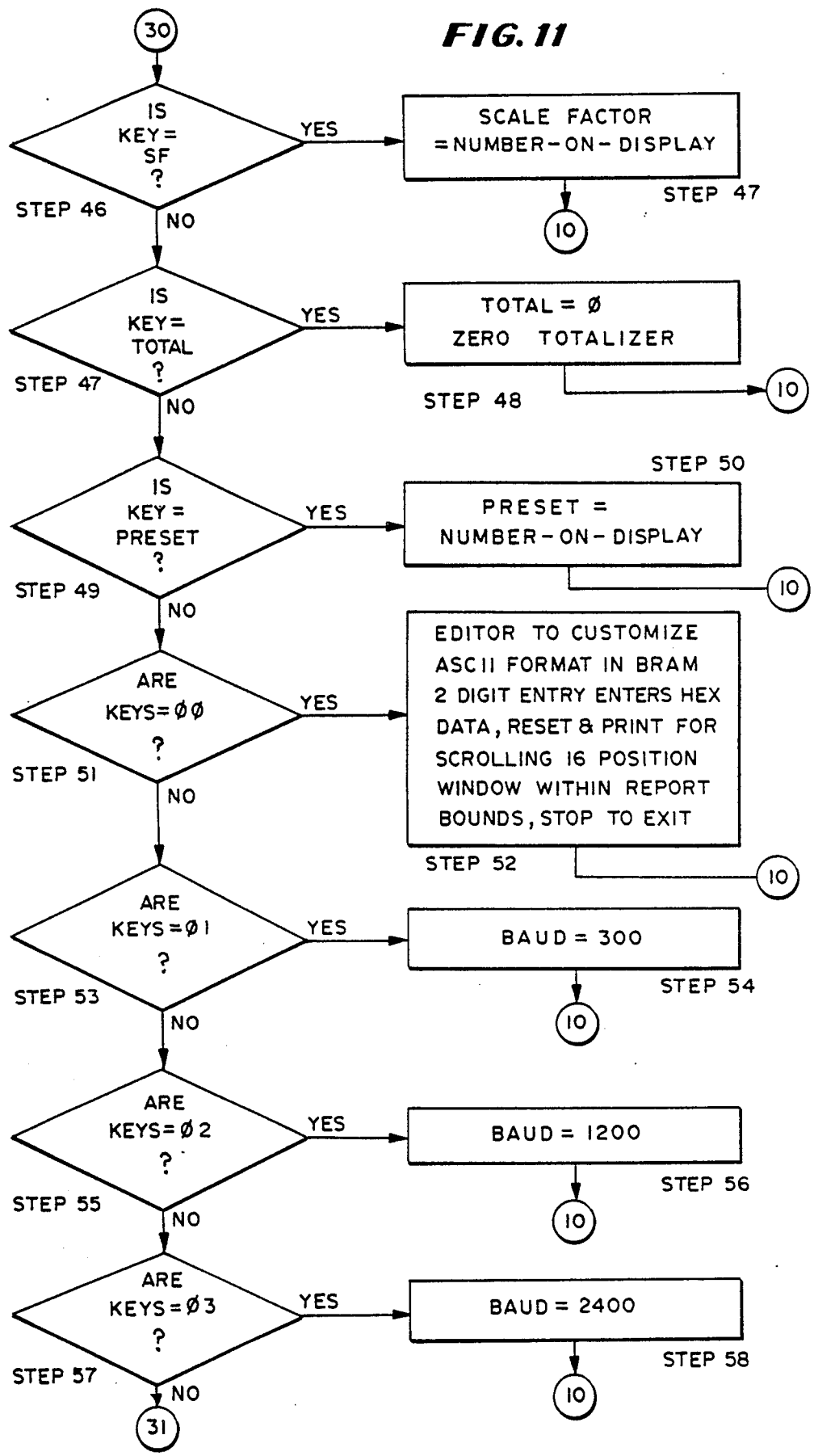
FIGS. 11-14 are flow charts of the routine or protocol carried out by the microprocessor of each microbatcher in carrying out a MODE subroutine.
Figure 12:
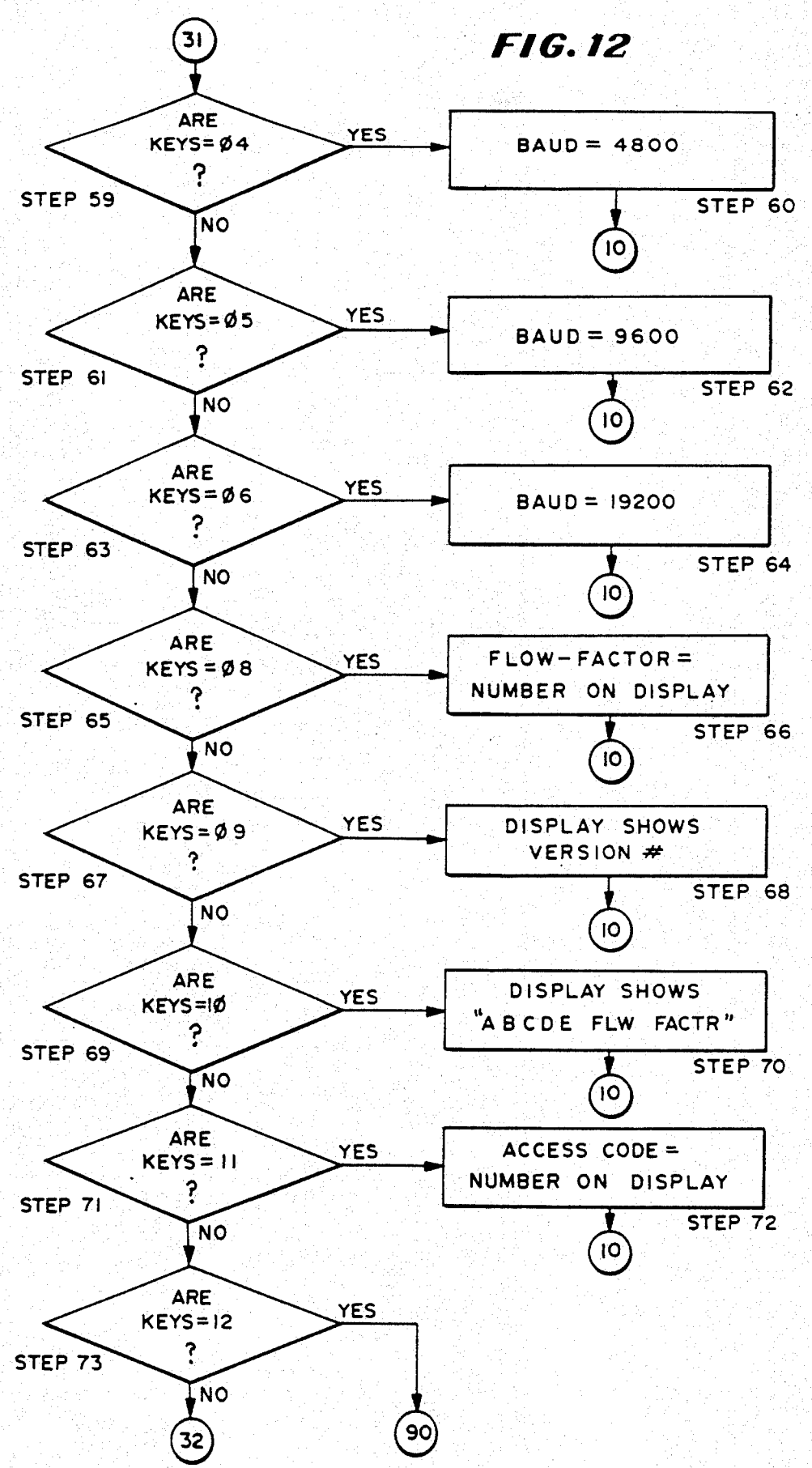
Figure 13:
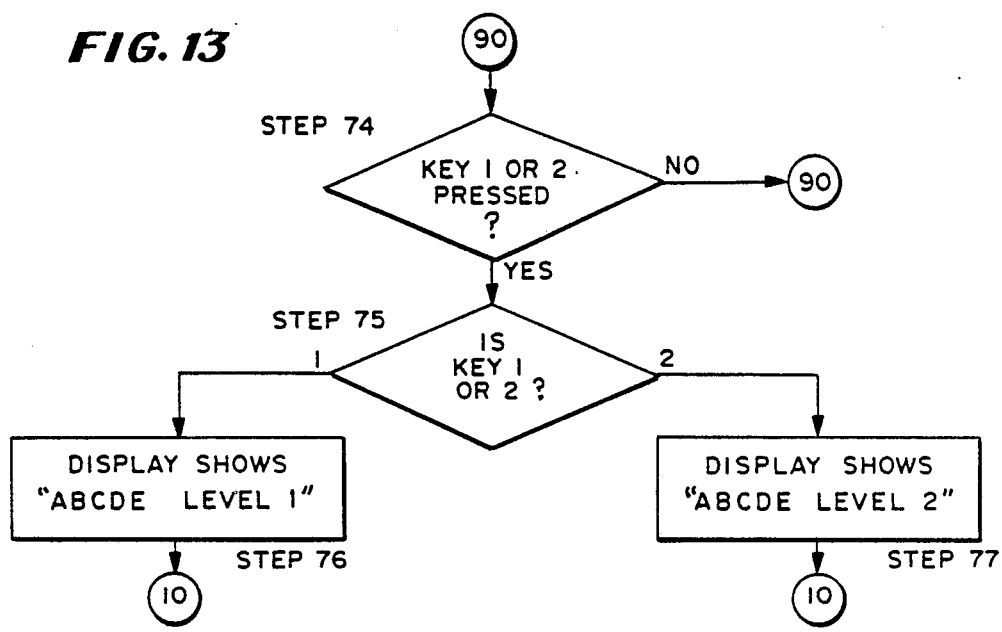
Figure 14:
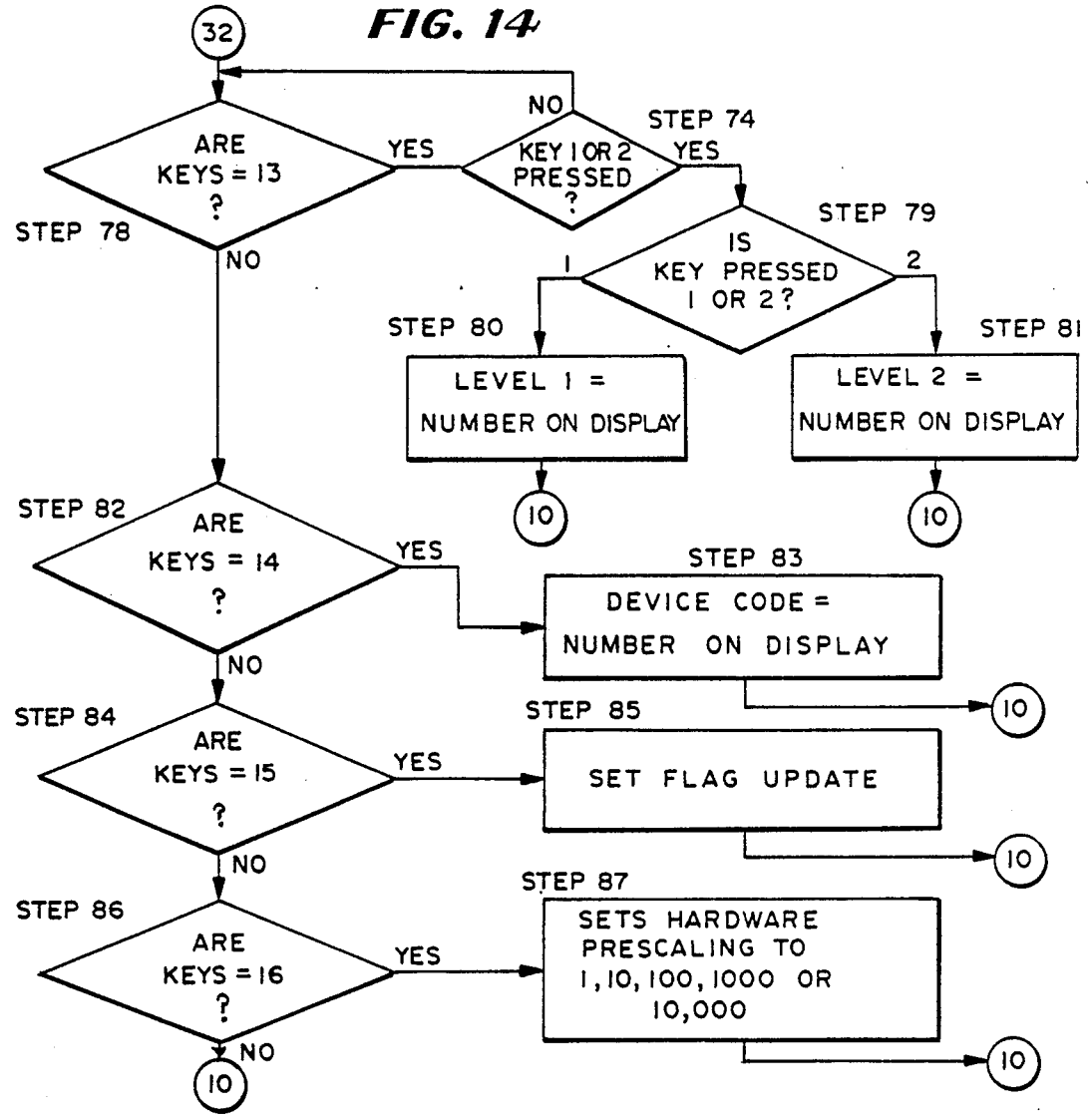

If yes, the program goes on to ask questions at STEPS 33, 35, 37 and 39 regarding the keys depressed and if yes, displays the number and parameter being checked at STEPS 34, 36, 38, and 40, as shown in FIGS. 9 and 10, and loops back to node 21 after each display.

If the answer was no, the program proceeds through STEPS 35–39 and if the answer is no at STEP 39, the program goes to STEP 41 to ask if the MODE Key has been depressed.

If the answer is yes, the question is asked at STEP 42 if the PRESET key has been depressed. If no, the program loops back to node 21.

If yes, the program goes on to STEP 43 to show on the display 66 that the NEXT PRESET = NUMBER ON DISPLAY at STEP 43 and then loops back to node 21.

If the answer is no at STEP 41, STEPS 22 and 23 are repeated.

Then if the key is not the PRINT key on a repeat of STEP 22, the program goes on to STEP 44 to determine if the key depressed was the STOP key. If yes, the program goes on to STEP 45 to indicate to the microprocessor 60 that the cycle flag is false and then loops back to node 21 at the beginning of STEP 28.

If the answer at STEP 44 is no, the program also loops back to node 21.

In FIGS. 11–19 are illustrated the flow charts for a MODE subroutine beginning at STEP 45.

At STEP 45 the question is asked if the SCALE FACTOR key had been depressed. If yes, the SCALE FACTOR is displayed on the visual display 66 at STEP 47 and the program loops back to node 10.

If the answer is no, at STEP 46, the program goes on to STEPS 47 and 49 to ask if other keys have been depressed such as TOTAL and PRESET and then if so, to show the number of those parameters on the visual display at STEPS 48 and 50 and the program loops back to node 10.

If the answer is no at STEP 49, the program goes on to STEP 51 and asks if key 00 has been depressed. If yes, the editor can then customize the ASCII format in the BRAM 64 and then perform other housekeeping functions at STEP 52 and then loop back to node 10.

If the answer was no, the program goes on to STEP 53 to determine if the key 01 had been depressed. If yes, the BAUD is set at 300 at STEP 54 and the program loops back to node 10.

If no, the program goes on to STEP 55 to ask if keys 02 have been depressed.

If yes, at STEP 56 the BAUD is set to 1200 and the program loops back to node 10.

If no, the program goes on to STEP 57 and asks if keys 03 have been depressed.

If yes, the BAUD is set at 2400 at STEP 58 and the program loops back to node 10.

If no, the program goes on to STEP 59 and asks if keys 04 were depressed.

If yes, at STEP 60 the BAUD is set at 4800 and the program loops back to node 10. If no, the program goes on to STEP 61 to ask if keys 05 have been depressed.

If yes, the program goes on to set the BAUD equal to 9600 at STEP 62 and loops back to node 10.

If no, the program goes on to STEP 63 and asks if keys 06 have been depressed.

If yes, the BAUD is set equal to 19,200 at STEP 64 and the program loops back to node 10.

If no, the program asks at STEP 65 if keys 08 have been depressed.

If the answer is yes, the FLOW FACTOR is displayed on the display at STEP 66 and the program loops back to node 10.

If yes, the program goes on to STEP 67 and asks if keys 09 have been depressed.

If yes, the display shows the version number of the software program in the microprocessor 60 on the visual display 66 at STEP 68 and then loops back to node 10.

If no, the program goes on to STEP 69 and asks if keys 10 have been depressed.

If yes, at STEP 70 the display shows the FLOW FACTOR and the program loops back to node 10.

If no, the program goes on to STEP 71 and asks if keys have been depressed.

If yes, the access code for the microprocessor 60 is displayed on the visual display at STEP 72 and the program loops back to node 10.

If no, at STEP 73 the program asks if keys 12 have been depressed.

If yes, the program goes on to STEP 74 to determine if the NUMBER key "1" or "2" has been depressed.

If no, it loops back to node 90 and asks the question again.

When the answer is yes, the program goes on to STEP 75 to determine if the key is key 1 or 2.

Then if key 1 has been depressed, at STEP 76 the visual display 66 shows a number followed by LEVEL 1 and the program loops back to node 10.

On the other hand, if key 2 had been depressed the program goes to STEP 77 and shows a number followed by LEVEL.2 and the program loops back to node 10.

If at STEP 73 the answer was no, the program goes on to STEP 78 and asks if keys 13 have been depressed.

If yes, the program goes to a repeat of STEP 74 and again asks if keys 1 or 2 have been depressed.

Then at STEP 79 a determination is made as to which key 1 or 2 has been depressed.

Then at STEP 80 if key 1 had been depressed, LEVEL 1 = (number on display), is shown on the visual display 66 and the program loops back to node 10.

On the other hand, if key 2 had been depressed at STEP 81 LEVEL 2 = (number on display) is shown on the visual display 66 and the program loops back to node 10.

If the answer at STEP 78 had been no, the program goes on to STEP 82 and asks if keys 14 have been depressed.

If yes, at STEP 83 the code number for that device, i.e. microbatcher, is displayed and the program loops back to node 10.

If the answer is no, at STEP 84 the program asks if keys 15 have been depressed.

If yes, the flow update is set at STEP 85 and the program loops back to node 10.

If no, the program goes on to STEP 86 and asks if keys 16 have been depressed. If yes, the program sets prescaling to 1, 10, 100, 1000 or 10,000 and then loops back to node 10.

If the answer is no, the program loops back to node 10.

Figure 15:
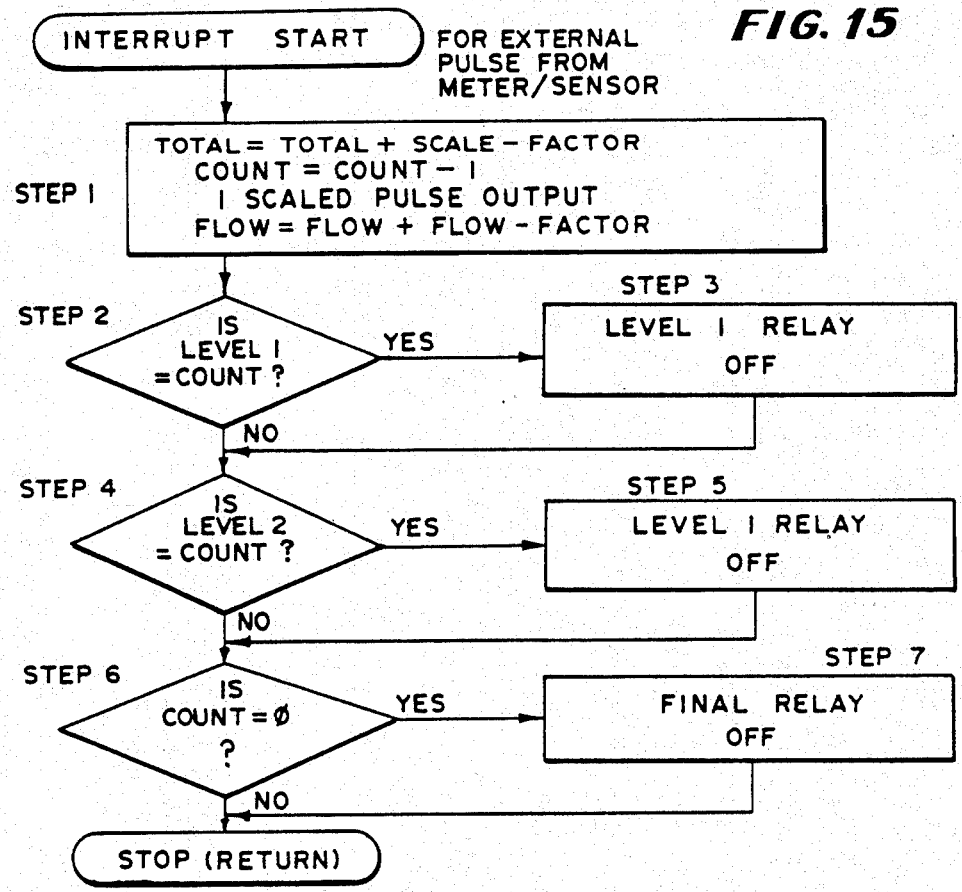
FIG. 15 is a flow chart of the routine or protocol carried out by the microprocessor of each microbatcher in processing an external pulse from a flowmeter to increment the count and to determine if any relays should be de-energized.

In FIG. 15 is illustrated a flowchart for an interrupt routine or protocol which is started by an external pulse being received by the microbatcher 30, such as from the flowmeter 26. Then from this interrupt start, the program goes to STEP 1 which determines from the microbatcher the TOTAL—which is a summation of TOTAL plus SCALE FACTOR for each interrupt, the current COUNT which equals the previous, generates 1 COUNT−1, scale output pulse, and determines FLOW which equals the summation FLOW plus FLOW FACTOR for each interrupt.

At STEP 2 the program asks does LEVEL 1 equal the COUNT for LEVEL 1.

If yes, the LEVEL 1 relay is de-energized and the program goes on to STEP 4.

If the answer is no, the program goes on to STEP 4.

At STEP 4, the question is asked is the LEVEL 2 equal to the COUNT for LEVEL 2.

If the answer is yes, the LEVEL 1 relay is turned off and the program loops back to STEP 6.

If it was no, the program moves on to STEP 6 and asks does the COUNT equal 0.

If yes, the FINAL relay is turned off at STEP 7 and the program loops to STOP and then RETURN to where the microprocessor had been before the interrupt. The same function occurs if the answer at STEP 6 was no.

Figure 16:
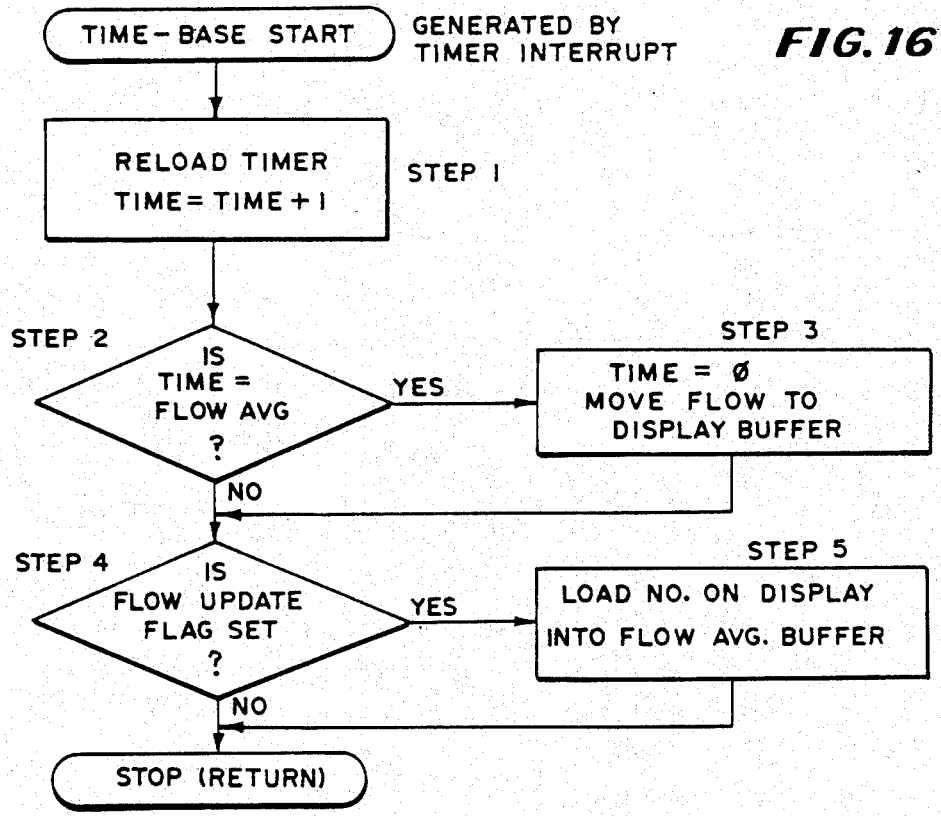
FIG. 16 is a flow chart of the routine or protocol carried out by the microprocessor of each microbatcher in processing a timer generated interrupt for determining and updating flow rate.

In FIG. 16 is illustrated a flow chart for an internal timer interrupt subroutine which forms a time base for determining the flow.

At STEP 1, the timer is reloaded to TIME = previous TIME+1.

Then at STEP 2 the question is asked is TIME = FLOW AVERAGE.

If yes, TIME = 0 is moved to a display buffer in the control circuit 50 and the program goes on to STEP 4.

If the answer is no, the program goes on to STEP 4 asking is FLOW UPDATE flag set.

If yes, the new value is loaded into the FLOW AVERAGE buffer and the program loops back to STOP - RETURN. If no, it just goes to STOP - RETURN where the microprocessor "picks up" where it "left off" before the interrupt.

Figure 17:
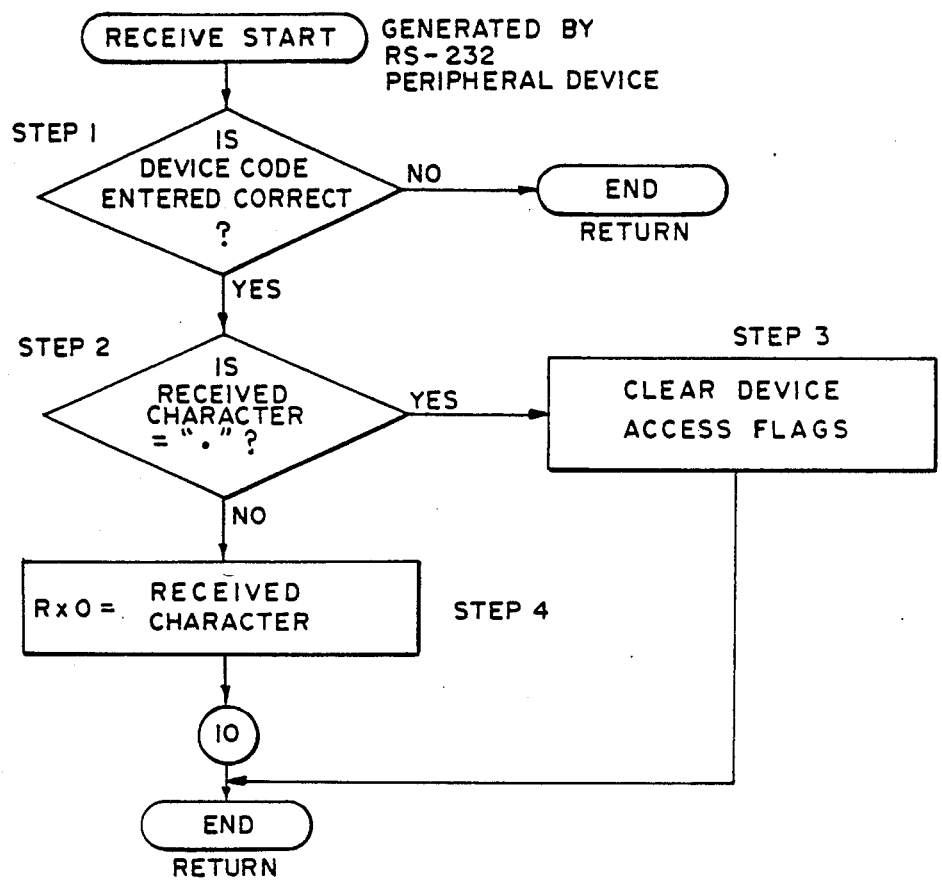
FIG. 17 is a flow chart of a routine or protocol carried out by the microprocessor of each microbatcher in processing a signal received by an RS-232 interface device coupled to the microprocessor to determine if that microprocessor is being accessed or addressed.

In FIG. 17 is illustrated a flow chart for an interrupt procedure generated by a signal received through the RS 232 peripheral innerface device 74.

After the receive is condition started, at STEP 1 the program asks is the device code, i.e. for that microbatcher, is correct.

If no, the routine ends or is aborted.

If yes, at STEP 2 the question is asked is the receive character equal to ".". If yes, the device is cleared as well as the access flags and the routine ends.

If no, at STEP 4 the receive character is displayed. Then it loops back to node 10 and/or returns the microprocessor to the place where it "left off" before the interrupt.

From the foregoing description, it will be apparent that the batch control system or microbatcher 30 of the present invention has a number of advantages some of which have been described above and others of which are inherent in the invention.

First of all, the microbatcher or batch control system 30 is an intelligent system which enables one to have complete control over the format of the output of a batching apparatus to which it is coupled. Furthermore, the intelligence of the system allows it to work in harmony with other microbatchers 30 and enables a plurality of the microbatchers 30 to be serially connected in a daisy chain. A host computer can communicate with any one of the microbatchers 30 in a daisy chain and each of the microbatchers 30 can communicate with a printer or other programmable controller coupled in the daisy chain with the respective microbatchers 30. In this respect, a user defined ASCII output stream enables easy interface of each microbatcher 30 with a variety of devices, such as printers, terminals, host computers and especially communication with programmable controllers. Each microbatcher 30 can be altered at will and new formats are retained by the microbatcher.

The serial port 72 in each microprocessor 60 together with the RS 232 interface device 74 facilitates addressability of any particular microbatcher 30 connected in the chain.

The microbatcher 30 can monitor flow rate as well as totalize the amount of batching controlled by that microbatcher 30 over any period of time desired, such as a day, week, month, etc.

Furthermore, one can input and change the scale factor as desired for reading out in pounds, gallons, quarts, etc.

The non-volatile battery backed up memory or BRAM 64 ensures that no data will be lost if there is a power outage and enables the microbatcher to pick up where it left off in the event of a power outage.

The keypad inputs of numbers and keys, particularly single keys for the five most important factors, enables one to quickly call up, input or change various operating parameters of the microbatcher 30, except, of course, when the microbatcher 30 is in the process of running a batch and the number of changes are limited.

Also, the alphanumeric display enables one to have a readout of not only a desired number quantity but also identification of the quantity in abbreviations such as TOTAL for TOTAL. In other words, an English language readout of information as well as numbers is provided.

Furthermore, the lamps 81-83 and the alphanumeric display 66 enable warning messages to be generated if nonvalid key sequences are punched into the keypad 60.

A scaled pulse output enables one to send a total of the product to a remote counter.

The connections to the inputs and outputs of the system 30 enable it to be compatible with existing fiberoptic to RS 232 C links.

Additionally, individual access codes can be used to provide multi-level protection of the system parameters.

Also, from the foregoing description, it will be apparent that modifications can be made to the batch control system or microbatcher 30 of the present invention without departing from the teachings of the invention.

Accordingly, the scope of the invention is only to be limited as necessitated by the accompanying claims.

We claim:

1. Control means for use in a batching system for controlling the batching of a fluid material from one container to another container through conduit means having a pump coupled therein, a flowmeter coupled therein and a valve coupled therein, said control means comprising:
   a microprocessor;
   a control panel;
   a keypad coupled to said microprocesor and mounted on said control panel, said keypad including a set of control keys for instantly displaying and/or setting primary operating parameters for controlling a batching operation, said set of control keys including a COUNT key for calling up on the display in a single key actuation, the current batch count or, if entered, the preset count for the next batch and a PRESET key for calling up on the display in a single key actuation the number of units remaining to be delivered in a current batch;
   battery backed non-volatile memory means coupled to said microprocessor;
   a serial port in said microprocessor;
   alphanumeric visual display means coupled to said microprocessor and mounted on said control panel;
   relay control output means coupled to said microprocessor and to relays for controlling energization of the pump and the valve, respectively; and
   at least one input coupled to said microprocessor for receiving count pulses from the flowmeter.

2. The control means of claim 1 including an input/output interface device coupled to said serial port for enabling serial, daisy-chaining, of said control means with the control means for another batching system.

3. The control means of claim 1 wherein said alphanumeric display means includes a 16 character alphanumeric display.

4. The control means of claim 1 wherein said relay output control means includes three outputs and said front panel has three indicating lamps for indicating energization and/or non-energization of each one of the three relay control outputs.

5. The control means of claim 1 wherein said keypad includes number keys 0 through 9.

6. The control means of claim 5 wherein said keypad and said microprocessor include means including said keys for enabling an operator to display on the alphanumeric visual display SCALE FACTOR, FLOW RATE, TOTAL or COUNT related to the fluid material being batched in a batching run.

7. The control means of claim 5 including a counter and a totalizer in said microprocessor and a programmable divider coupled between said at least one input and said microprocessor whereby pulses from said flowmeter can be reduced to a smaller number which can be more easily manipulated by said microprocessor, said totalizer being operable to keep a total count of units of fluid material transferred from the one container to the other container, for a time period including a day, a week or a month of all the fluid material batched and said counter being decremented from a programmed count to 0 for each batch processed in a batching run by said control means.

8. The control means of claim 5 wherein said microprocessor includes means for averaging the flow and for continually determining the flow rate of fluid material per unit of time.

9. The control means of claim 1 wherein said control keys further includes a SCALE FACTOR key, a RATE key and a TOTAL key.

10. The control means of claim 1 wherein said keypad includes a set of operation keys for controlling basic operation of said control means, said set of operational keys including a START key, A RESET key, a MODE key, a PRINT key and a STOP key.

11. The control means of claim 1 wherein said keypad includes number keys 0 through 9 said set of control keys further includes a SCALE FACTOR key, a RATE key, and a TOTAL key and a set of operational keys for controlling basic operation of said control means, said set of operational keys including a START key, a RESET key, a MODE key, a PRINT key and a STOP key.

12. The control means of claim 11 wherein said microprocessor and said keypad include means including said SCALE FACTOR key for enabling the fluid material to be represented in the microprocesor in desired SCALE FACTOR units.

13. The control means of claim 11 wherein said microprocessor includes means including said keypad and PRESET and RESET keys for entering the COUNT for a subsequent batch while one batch is being run.

14. The control means of claim 1 further including a data bus, said microprocessor and said memory being coupled to said data bus.

15. The control means of claim 1 further including display drivers coupled to said data bus and to said alpha-numeric display means.

16. The control means of claim 1 including a programmable divider coupled between said at least one input and said microprocessor.

17. The control means of claim 1 wherein said at least one input is an opto-isolated input.

18. The control means of claim 1 further including data output means for supplying data to a station remote from said control means.

19. The control means of claim 18 wherein said output means includes an output which can be coupled to another control means for another batching system to enable the first named control means to control initialization/operation of the second named control means.

20. The control means of claim 18 further including a data bus and an input/output expander with RAM coupled between said data bus and said at least one input and said relay control output means.

21. The control means of claim 18 wherein said data output means includes at least one opto-isolated output.

22. The control means of claim 18 wherein said station is a manager's office.

23. The control means of claim 18 wherein said station is at the location of one of the containers.

24. The control means of claim 1 wherein said control keys include a SCALE FACTOR key.

25. The control means of claim 1 wherein said control keys include a RATE key.

26. The control means of claim 1 wherein said control keys include a TOTAL key.

27. The control means of claim 1 wherein said keypad includes number keys 0 through 9, said control keys further include a RATE key, a SCALE FACTOR key and a TOTAL key, said control means further includes a set of operational keys including a START key, a MODE key and a PRINT key and a STOP key, and means, operable in conjunction with actuation of respective ones of said keys, for controlling the print out of the parameter for each batch together with product identifiers.

28. Control means for use in a batching system for controlling the batching of a fluid material from one container to another container through conduit means having a pump coupled therein, a flowmeter coupled therein and a valve coupled therein, said control means comprising:

a microprocessor;

a control panel;

a keypad coupled to said microprocessor and mounted on said control panel, said keypad including a set of control keys for instantly displaying and/or setting primary operating parameters for controlling a batching operation, said set of control keys including a SCALE FACTOR key, a RATE key, a TOTAL key, a COUNT key and a PRESET key;

battery backed non-volatile memory means coupled to said microprocessor;

a serial port in said microprocessor;

alphanumeric visual display means coupled to said microprocessor and mounted on said control panel;

relay control output means coupled to said microprocessor and to relays for controlling energization of the pump and the valve, respectively; and at least one input coupled to said microprocessor for receiving count pulses from the flowmeter.

* * * * *